UNITED STATES PATENT OFFICE 2,022,233

CO-AMIDE RESIN AND PROCESS OF MAKING SAME

Carleton Ellis, Montclair, N. J., assignor, by mesne assignments, to Unyte Corporation, New York, N. Y., a corporation of Delaware No Drawing. Application January 17, 1935, Serial No. 2,223

5 Claims. (Cl. 260—3)

The present invention relates to urea (carbamide) aldehyde condensation products, particularly those made with formaldehyde, employed in conjunction with other amido bodies and/or derivatives, and relates especially to urea products of the character specified incorporated with other amide derivatives preferably under conditions favoring coreaction and interresinification.

A number of amides, including aliphatic amides typified by acetamide and succinimide, and also aromatic amides, of which phthalimide is representative, are capable of reacting with formaldehyde to produce methylol compounds. Compounds of this character are capable of blending with and interreacting to a greater or lesser extent with methylolurea compounds such as mono- and di-methylolurea or mixtures of these.

The present invention is based on the observation that substantial proportions of such amido compounds and their methylol derivatives are capable of blending with urea-formaldehyde condensation products or of reacting and resinifying therewith, as the case may be, to form bodies which have properties differing from those of the normal urea-formaldehyde resin, particularly in respect to solubility and fusibility.

When urea and formaldehyde react mono- and dimethylolureas are formed. As is known, further building up of a resin molecule from these substances is conditioned by a condensation in which water is split out, leading to a final complex polymer consisting of intertwined chains. The high molecular complexity of the polymer is due to the fact that urea is a diamide and can, therefore, direct double-chain growth, that is, it causes branching intertwined chains. On the other hand, monamides and imides react with aldehydes to yield methylol derivatives in which further growth, if at all, can occur in only one direction with the formation of linear polymers. For example, formamide and formaldehyde yield methylolformamide and methylene-di-formamide. Phthalimide gives methylolphthalimide.

When formaldehyde is reacted with a mixture of a urea and a monamide or imide, the following effects are observed. The extent to which these properties are manifest depends, of course, upon the proportions of the reactants and the degree to which they combine.

1. The product is more soluble in organic solvents than is the unmodified urea resin.
2. It is more fusible.
3. It heat-hardens at a slower rate.
4. It is softer, indicating a plasticized complex.
5. In the initial forms it is more rubbery when warm, permitting it to be pulled out or extruded in fibers or threads.

It is believed that, when formaldehyde is reacted with a mixture of urea and a monamide or imide, the initial state of affairs is the formation of a mixture of methylolureas and methylolamides (or -imides). Further condensation results in the splitting out of water between methylol groups and amido groups, not only between similar molecules but between dissimilar molecules; that is, between methylolureas and methylolamides. There is thus formed a mixed polymer or co-amide resin.

The following schemes are presented to illustrate these reactions more clearly.

a. In a mixture of formaldehyde and urea alone, urea and formaldehyde form methylolureas (mono- or di-, depending on proportions and conditions), and these condense to form complex branched interlocking-chain molecules:

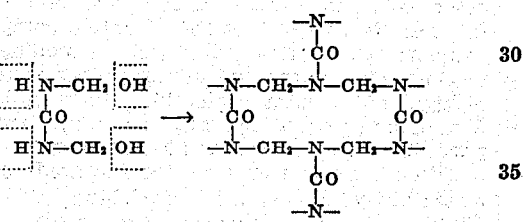

b. Monamides ($RCONH_2$) alone condense with aldehydes to form, in general, relatively simple compounds:

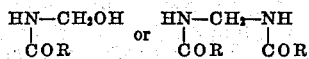

c. Imides (($RCO)_2NH$) alone react with formaldehyde to form monomethylol derivatives:

$$(RCO)_2N—CH_2—OH$$

d. Since the first step is the formation of methylol bodies, resinification of a mixture of urea and a monamide with formaldehyde can be pictured as follows:

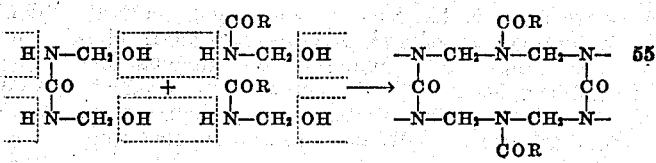

e. Resinification of a mixture of urea and an imide with formaldehyde can be pictured as follows:

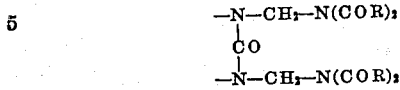

In the above schemes the free bonds represent points at which further combinations occur. The final formulas are molecular fragments.

It will be noted that the tendency of amides and imides is to modify the molecular structure of the urea-formaldehyde complex. Wherever such reactants condense into the urea-methylene network further growth at these points occurs in a linear direction (monamides), or further growth ceases (imides). The above theoretical discussion is not to be taken as limiting but merely to explain the observed effect of modifying agents which are reactive with formaldehyde on the properties of urea-formaldehyde condensation products.

The properties of the final modified resin depend upon the degree of interreaction between the various reactants, which in turn depends upon the relative rates of reaction and proportions of substances present. Besides the substantially completely co-reacted products outlined above, there may also be present free or only partially reacted modifying agents. Monamides and imides such as formamide, acetamide, succinimide and phthalimide are powerful solvents for urea condensation products and serve as plasticizers or fluxes. This is also true of their methylol derivatives. Therefore, in the final product, free or partially reacted monamides or imides may desirably be present. Such modifiers may result from sluggish condensation under the particular conditions of the reaction, or from the use of an excess of modifying agent, or they may be actually added to a urea condensation already formed. In this respect the invention comprises resinous urea condensation products modified by fluxing agents of the type of monamides or imides of high boiling point, preferably interresinified to a maximum extent but also containing free or partially combined monamido compounds.

Other fluxes can also be incorporated as disclosed in my Patent No. 1,536,882, May 5, 1925, including glue, albumin, casein and glycerol. Such bodies are advocated as tempering or modifying agents to alter the physical properties of urea resin. A plasticizing agent should be substantially non-volatile. Hence the use of substances such as glue, albumin, casein, glycerol, phthalimide, succinimide, naphthalimide, diphenimide, oxamide and/or their aldehyde compounds whether chemically combined with the resin or present in an uncombined but molecularly dispersed form in the resin. It will be noted that all such bodies are reactive with formaldehyde. Other plasticizing agents of the same category include acetamide, diacetamide, methylenediacetamide, propionamide, butyramide, valeramide, lauramide, palmitamide, stearamide, linoleamide, eleostearamide, abietamide, chloralacetamide, benzamide, dibenzamide, methylenedibenzamide, benzanilide, toluenesulphonamide, glutarimide, and their substitution products. These compounds boil at a very high temperature and are substantially non-basic in aqueous solution.

The following examples are given as illustrative of the scope of this invention. Aqueous formaldehyde solution of commercial grade (concentration 37 per cent by weight) is shown in each case. However, solutions of any desired concentration can be used; also formaldehyde polymers and other reactive aldehydes. Thiourea or mixtures of urea and thiourea are also contemplated. Proportions given are parts by weight.

*Example 1*

| | Parts |
|---|---|
| Formaldehyde solution | 100 |
| Urea | 30 |
| Phthalimide | 15 |
| Sodium bicarbonate | 1 |

The mixture was heated under a reflux condenser for 10 minutes and then was distilled under reduced pressure at 70–80° C. 64 parts of liquid were collected. The residue was heated in an oil bath until evolution of vapors had practically ceased and the product was poured into a mold. At ordinary temperature it was a somewhat soft, tough, transparent mass. When baked at 70° C. a hard, transparent casting was produced.

*Example 2.*—The same procedure and proportion of ingredients was used as in Example 1, but only 55 parts of liquid were distilled off. This produced a clear viscous condensation product. To 30 parts of the latter there were added 30 parts of isopropyl alcohol and 1 part of acetic acid. When heated over a water bath for an hour a clear water-white solution was produced from which there was no tendency for phthalimide to separate on standing. The solution deposited a hard film on drying and was used to impregnate glassine paper to form a transparent sheet.

*Example 3.*—To 1 part of the isopropyl alcohol solution of Example 2 there was added an equal amount of a 25 per cent solution of nitrocellulose in ethyl acetate. The mixture was slightly turbid but became clear when a small amount (about 10 per cent) of ethylene glycol monomethyl ether was added. Nitrocellulose is compatible with the resin. The film from this solution was smooth, colorless and tough.

*Example 4.*—The viscous condensation product of Example 2 was dissolved in ethyl alcohol to form a 50 per cent solution. This solution was mixed with an equal amount of a 25 per cent solution of nitrocellulose in ethyl acetate and 2 parts of this lacquer were used to impregnate 1 part of alpha cellulose. The impregnated mass was allowed to dry in the open air and was then mixed with 1 per cent of glycerol dichlorohydrin (curing catalyst) and 0.2 per cent of zinc stearate (mold lubricant) and ground in a ball mill. The powder thus obtained was pressed in a mold for 2 minutes at 120° C. and yielded a light-colored, exceptionally strong molding.

*Example 5.*—5 parts of the lacquer described in Example 4 were ground with 1 part of titanium dioxide. This produced an enamel which dried to a pure white, tough, glossy film. One important advantage of this enamel is that it does not change in color with time when exposed to light. For a permanent white enamel, any nonreactive white pigment can be used in amounts depending upon the gloss desired, large proportions of pigment, of course, giving a flat effect. Also, for brush application higher-boiling solvents are preferred, such as the higher alcohols and the glycol ethers.

*Example 6*

| | Parts |
|---|---|
| Formaldehyde solution | 120 |
| Phthalimide | 74 |
| Urea | 30 |
| Sodium bicarbonate | 2 |

This mixture was heated under reflux for 15 minutes and formed a clear solution. When concentrated under reduced pressure at 90° C. a clear viscous liquid was obtained, which at ordinary temperature became a hard, opaque mass partially soluble in alcohol. This example makes use of 1 mole of phthalimide to 1 mole of urea.

The plasticizing effect of formamide on urea resin is shown by the following examples.

*Example 7*

| | Parts |
|---|---|
| Formaldehyde solution | 275 |
| Urea | 60 |
| Formamide | 45 |
| Sodium carbonate | 2 |

These substances were mixed and refluxed for 15 minutes, and then distilled until the temperature of the vapor was 110° C. During this time 120 parts of liquid came over and at this stage the product was soluble in warm methyl or butyl alcohol but only partially soluble cold. The mixture was further concentrated at 100° C. under vacuum until a total of 130 parts of liquid had distilled. At this stage the resin was readily soluble in butyl alcohol. Further distillation decreased the solubility in alcohols and the final product was a sticky material which softens readily when heated.

*Example 8*

| | Parts |
|---|---|
| Formaldehyde solution | 290 |
| Urea | 60 |
| Formamide | 52 |
| Sodium bicarbonate | 2 |

Heated under a reflux condenser for 1 hour and then distilled under atmospheric pressure up to 155° C. 175 parts of liquid came over and the product at ordinary temperatures was a very sticky jelly which was perfectly transparent.

*Example 9*

| | Parts |
|---|---|
| Formaldehyde solution | 200 |
| Urea | 60 |
| Sodium bicarbonate | 2 |

This mixture was heated under reflux for 15 minutes, after which 110 parts of liquid were removed by distillation. Then 10 parts of the clear jelly-like product of Example 8 and 1 part of acetic acid were added. Upon further concentration the product became exceptionally clear. It was somewhat soft at ordinary temperature. Baking of the cast material at 50° C. for a protracted period completed the reaction and produced a clear, hard, tough mass.

Methylolformamide can be used to modify a urea resin as shown below.

*Example 10.*—Methylolformamide was made by heating under reflux for 1 hour a mixture of 15 parts formaldehyde solution, 9 parts formamide and 1 part sodium carbonate and distilling off all volatile material up to 140° C. A mixture of 200 parts formaldehyde solution, 60 parts urea and 2 parts sodium bicarbonate was heated under reflux for 15 minutes and distilled until the temperature of the mixture reached 105° C. 10 parts of methylolformamide were then added and distilled under slightly reduced pressure (15 inches) until the temperature reached 110° C. When allowed to cool the product solidified to a clear transparent mass which softened at about 50° C. and was molten at 60° C. This was readily soluble in benzyl alcohol and in formamide. At ordinary temperatures the product was very sticky and somewhat rubbery. When warmed it could be drawn into fine threads. Applied to surfaces to be joined, it formed a satisfactory adhesive.

*Example 11.*—When heated, formamide itself is an excellent solvent for urea-formaldehyde resins, even for those in the cured form. In one case, 10 cc. of formamide and 5 grams of urea condensation product (made by reaction of 2 moles of formaldehyde and 1 mole of urea in the presence of barium hydroxide and drying the resulting material) were heated to 160° C. The condensation product dissolved with considerable evolution of gas to give a clear solution.

As a plasticizer for urea resin, formamide would, of course, be used in smaller amount, or a solution of substantially cured urea resin in formamide could be added to uncured resin, although for a plasticizer it is generally preferable to use a higher-boiling substance than formamide. Substances of the type of phthalimide or methylolphthalimide are good solvents for urea resin.

*Example 12.*—A soluble, fusible urea-formaldehyde condensation product was made by mixing 180 parts formaldehyde solution, 60 parts urea and 1 part sodium bicarbonate and allowing to stand overnight at a temperature of 15-20° C. The precipitate was filtered off and dried. It was readily soluble in warm water. 10 parts of this urea condensation product and 6 parts phthalimide were mixed and heated rapidly to 230-240° C. while being well stirred. Heating was continued until foaming ceased and a clear melt formed. The product when cold was a clear, light-yellow brittle resin readily soluble in a mixture of dioxan and ethylene glycol monoethyl ether.

*Example 13.*—A urea condensation product in somewhat more advanced stage of reaction was obtained by mixing 4 parts formaldehyde solution and 1 part urea. After standing overnight at a temperature below about 20° C. the white precipitate which formed was filtered off and dried. It was only slightly soluble in boiling water. 15 parts phthalimide were fused and 12 parts of this urea condensation product were added gradually. When all the condensation product had been introduced the temperature was held at 215-225° C. until all foaming ceased and a clear light-colored fusible resin was obtained.

*Example 14.*—A highly reacted urea-formaldehyde condensation product was made by adding 5 cc. concentrated hydrochloric acid to a mixture of 100 grams formaldehyde solution and 30 grams urea. The amorphous precipitate was filtered and dried. 5 parts of phthalimide and 2 parts of the condensation product when heated above the melting point of phthalimide, fused to a clear liquid. Darkening occurred on account of the high temperature.

In the incorporation of phthalimide with urea resins, part of the imide can be replaced by formamide which serves to lower its melting point. This permits a lower temperature to be used and a lighter-colored product to be obtained. High-boiling solvents like benzyl alcohol and nitrobenzene can also be added. Methylolphthalimide has a lower melting point than phthalimide and its use in place of phthalimide itself enables the reaction to occur at a lower temperature.

*Example 15.*—Methylolphthalimide was made by heating equimolecular amounts of phthalimide and formaldehyde solution under a reflux condenser for 1 hour. A clear solution was obtained which upon cooling deposited a white precipitate. This was filtered off and dried. The unpurified material melted at about 125° C. A mixture of 5 parts methylolphthalimide and 2 parts of a substantially cured urea resin was heated to 145° C. A clear solution formed which upon cooling became a solid mass.

Urea resins modified by phthalimide are somewhat brittle in the final form. For coating compositions it is desirable to have resins which yield less brittle films. Interreacted formamide serves as a softener for such resins.

*Example 16*

| | Parts |
|---|---|
| Formaldehyde solution | 200 |
| Urea | 60 |
| Phthalimide | 20 |
| Formamide | 5 |
| Sodium bicarbonate | 2 |

This mixture was heated under a reflux condenser for 15 minutes and then distilled at reduced pressure at 80–90° C. until 115 parts of liquid was removed and a viscous liquid remained. 3 parts of this product dissolved in 2 parts of methyl alcohol gave a clear solution which on drying deposited a colorless, tough film.

Thiourea can be used in place of urea in any of the above examples. Also, part of the urea can be replaced by thiourea.

*Example 17*

| | Parts |
|---|---|
| Formaldehyde solution | 220 |
| Thiourea | 45 |
| Urea | 15 |
| Phthalimide | 40 |
| Formamide | 10 |
| Sodium bicarbonate | 2 |

This mixture was treated in the same way as Example 16. 30 parts of the dehydrated condensation product, 30 parts ethyl alcohol and 1 part acetic acid were heated under reflux for 1 hour. This solution when cooled remained clear and was miscible with a solution of nitrocellulose in ethyl acetate.

Another aspect of this invention relates to the formation of soluble resins from cured urea resin compositions. This refers especially to the working up or recovery of utilizable values from scrap and waste material from a molding plant including flash and rejects. It also refers to recovery of molding compositions which are off-color or have deteriorated from prolonged storage so as to be precured to such an extent that the flow under hot-pressing is adversely affected. The waste material in powdered form is heated with an amido body such as phthalimide, succinimide, formamide, etc., with or without a solvent like benzyl alcohol, ethylene glycol, glycol ethers, ethylene chlorohydrin or nitrobenzene. Fillers, pigments and other insoluble substances are removed from a solution of the resin thus obtained by filtration or by settling and decantation, after which the resin is recovered by distilling off the solvent or by adding a nonsolvent which precipitates the resin.

*Example 18.*—12½ parts of fully cured urea resin-cellulose molding in fragmented form was mixed with 5 parts of phthalimide and 10 parts of benzyl alcohol. The mixture was heated to 205° C. and kept simmering for about 15 minutes. Several changes took place during the heating. Primarily there was a whitening of the crushed molded product. This stage continued for about 10 minutes, after which the pieces of urea molding began to soften and fall apart, and the cellulose material floated free in the solution. The solution was decanted and cleared of cellulose material and the temperature raised to 210° C. to distill off the benzyl alcohol. Finally the temperature was carried to 225° C. and held until a sample drop when cooled to room temperature showed a hard, brittle resin. The resin was readily fusible, light in color and soluble in cellosolve-dioxan solvent.

*Example 19.*—A blue pigmented, fully cured urea resin-cellulose molding was crushed and heated with an equal weight of formamide at 170°–180° C. At this temperature a rapid reaction took place with much foaming and the urea molding almost entirely disintegrated. The pasty mass was extracted with a small amount of cellosolve and strained to remove the cellulose material. The cellosolve was then distilled off, leaving a soft, sticky, blue colored, readily soluble and fusible resin which became harder when the excess formamide was removed by heating the resin at about 200° C. This pigmented resin can be used as an enamel base. Or, the pigment can be removed by filtration of the resin solution or by allowing the pigment to settle.

*Example 20.*—A urea resin-cellulose molding fully cured at 125° C. for 3 minutes at 3500 lbs. per square inch was crushed, mixed with an equal amount by weight of succinimide, and heated. At 126° C. the succinimide melted and at 170° C. reaction took place accompanied by foaming. The temperature was held at 200° C. until the foaming had died down somewhat then raised to 225° C. until the pasty mass became difficult to stir. The molded product had disintegrated entirely to the cellulose material and fusible resin. The paste was extracted with cellosolve and the cellosolve solution was filtered to remove the insoluble material and concentrated to give a light brown lacquer solution. A film from this solution dried to a clear, hard lustrous surface.

The products of this invention, as noted above, comprise resinous substances adapted for use in coating compositions and particularly as bases for color-stable enamels. Another contemplated application is as agents to improve the transparency of paper, thin fabrics and the like. Miscibility with urea resin compositions adapted for hot-pressing emphasizes their use for modifying the flow of such molding compositions, either to increase the flow of these compositions so as to render them of normal flowability or to adjust the flow in such a way that they can be used for pressure-casting. The latter procedure requires a degree of plasticity (gate-flowability) of the potentially reactive resin or plastic permitting free travel along the gates and into the mold cavity to charge the latter completely in all possible parts where it subsequently heat-hardens.

What I claim is:

1. The process which consists in incorporating urea-formaldehyde condensation products with substantial proportions of phthalimide and reacting to form a resinous product.

2. The process which comprises reacting urea and formaldehyde and at some stage incorporating a substantial proportion of a phthalimide product.

3. A condensation product of urea, formaldehyde and phthalimide-formaldehyde.

4. A condensation product of urea, formaldehyde and phthalimide.

5. A condensation complex of urea, formaldehyde and an aromatic imido derivative.

CARLETON ELLIS.